(12) United States Patent
McMunigal et al.

(10) Patent No.: US 7,159,299 B1
(45) Date of Patent: Jan. 9, 2007

(54) SPRING ASSISTED HEAD STACK ASSEMBLY COMB

(75) Inventors: Tom E. McMunigal, Mead, CO (US); John D. McCrandall, Longmont, CO (US)

(73) Assignee: Maxtor Corporation, Scotts Valley, CA (US)

(*) Notice: Subject to any disclaimer, the term of this patent is extended or adjusted under 35 U.S.C. 154(b) by 94 days.

(21) Appl. No.: 10/414,414

(22) Filed: Apr. 14, 2003

Related U.S. Application Data

(60) Provisional application No. 60/432,158, filed on Dec. 10, 2002.

(51) Int. Cl.
  *G11B 5/127* (2006.01)
  *H04R 31/00* (2006.01)

(52) U.S. Cl. ............... 29/603.03; 29/603.04; 29/603.05; 360/254.3; 360/254.4; 360/254.6; 360/255.2; 360/255.3; 360/255.4; 360/255.5

(58) Field of Classification Search ............... 29/603.03–603.05; 360/97.01–97.03, 254.3–254.6, 360/255.2–255.5
See application file for complete search history.

(56) References Cited

U.S. PATENT DOCUMENTS

| | | | |
|---|---|---|---|
| 4,703,376 A * | 10/1987 | Edwards et al. ......... | 360/254.3 |
| 5,535,074 A | 7/1996 | Leung ..................... | 260/104 |
| 5,826,325 A * | 10/1998 | Price et al. ............. | 29/603.03 |
| 5,831,795 A * | 11/1998 | Ma et al. ................ | 360/254.3 |
| 6,069,773 A | 5/2000 | Frater et al. ............ | 360/104 |
| 6,473,268 B1 * | 10/2002 | Simozato ................ | 360/254.3 |
| 6,583,963 B1 * | 6/2003 | Boutaghou ............. | 360/254.7 |

FOREIGN PATENT DOCUMENTS

JP 06139735 A * 5/1994

OTHER PUBLICATIONS

"Micro electrostatic actuators in dual-stage disk drives with high track density"; Tang, Y.; Chen, S.X.; Low, T.S.; Magnetics, IEEE Transactions on vol. 32, Issue 5, Sep. 1996 pp. 3851-3853.*

* cited by examiner

*Primary Examiner*—Paul D. Kim
(74) *Attorney, Agent, or Firm*—James L. Johnson

(57) ABSTRACT

A head stack assembly comb (154) for maintaining the heads (44) of a head stack assembly (26) in spaced relation is disclosed. The head stack assembly comb (154) includes a comb body (158) and a latch (218). The comb body (158) engages an upper surface of an uppermost actuator arm (30a) in the head stack assembly (26). The latch (218) engages a lower surface of this same actuator arm (30a). When installing the comb (154), the comb (154) is pivoted relative to the head stack assembly (26). This brings the latch (218) into engagement with the noted actuator arm (30a) and causes the latch (218) to pivot in a first direction against a spring (214), and then in the opposite direction by the action of the spring (214) on the latch (218) to engage the latch (218) with the lower surface of the noted actuator arm (30a).

24 Claims, 12 Drawing Sheets

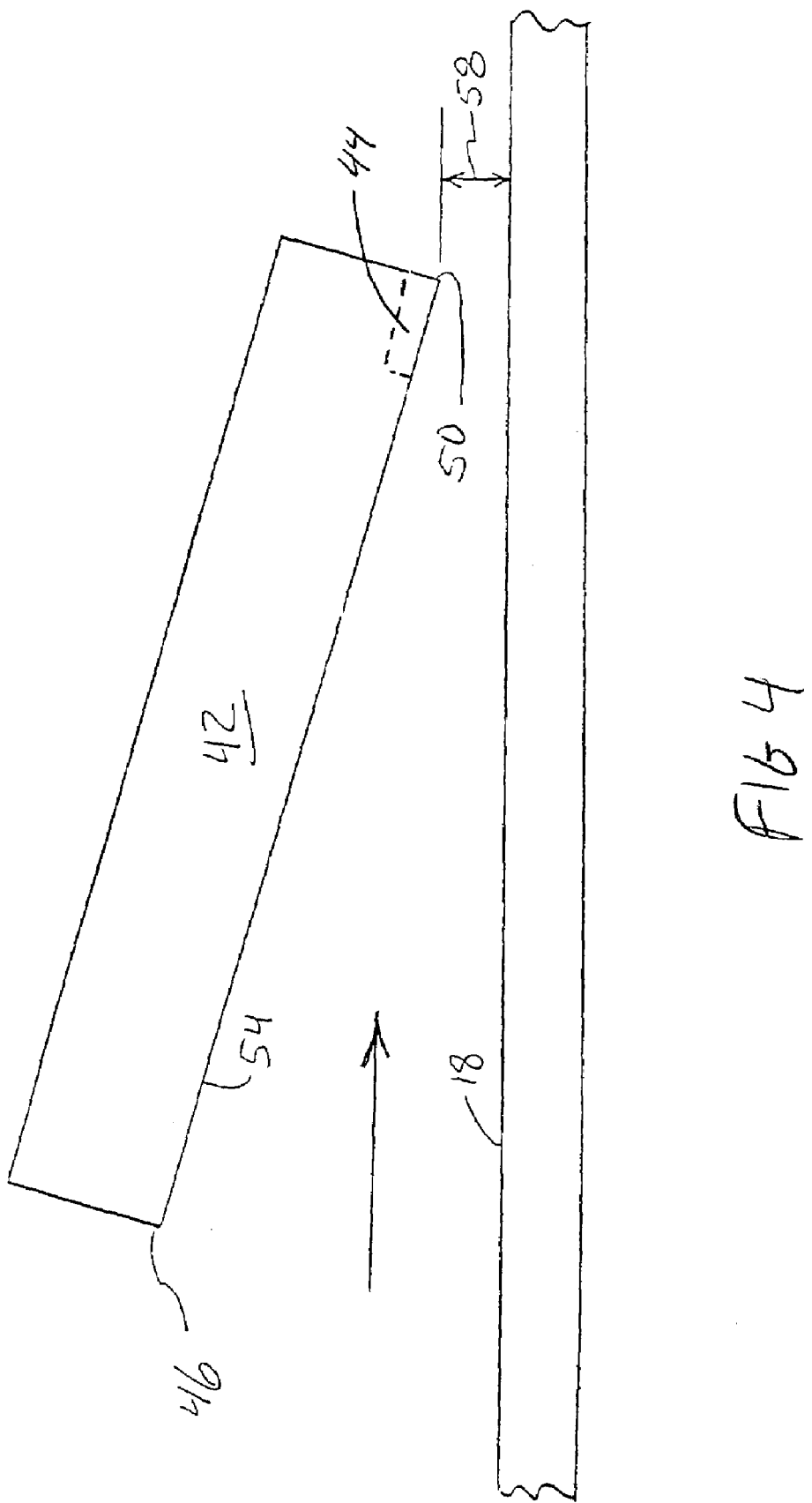

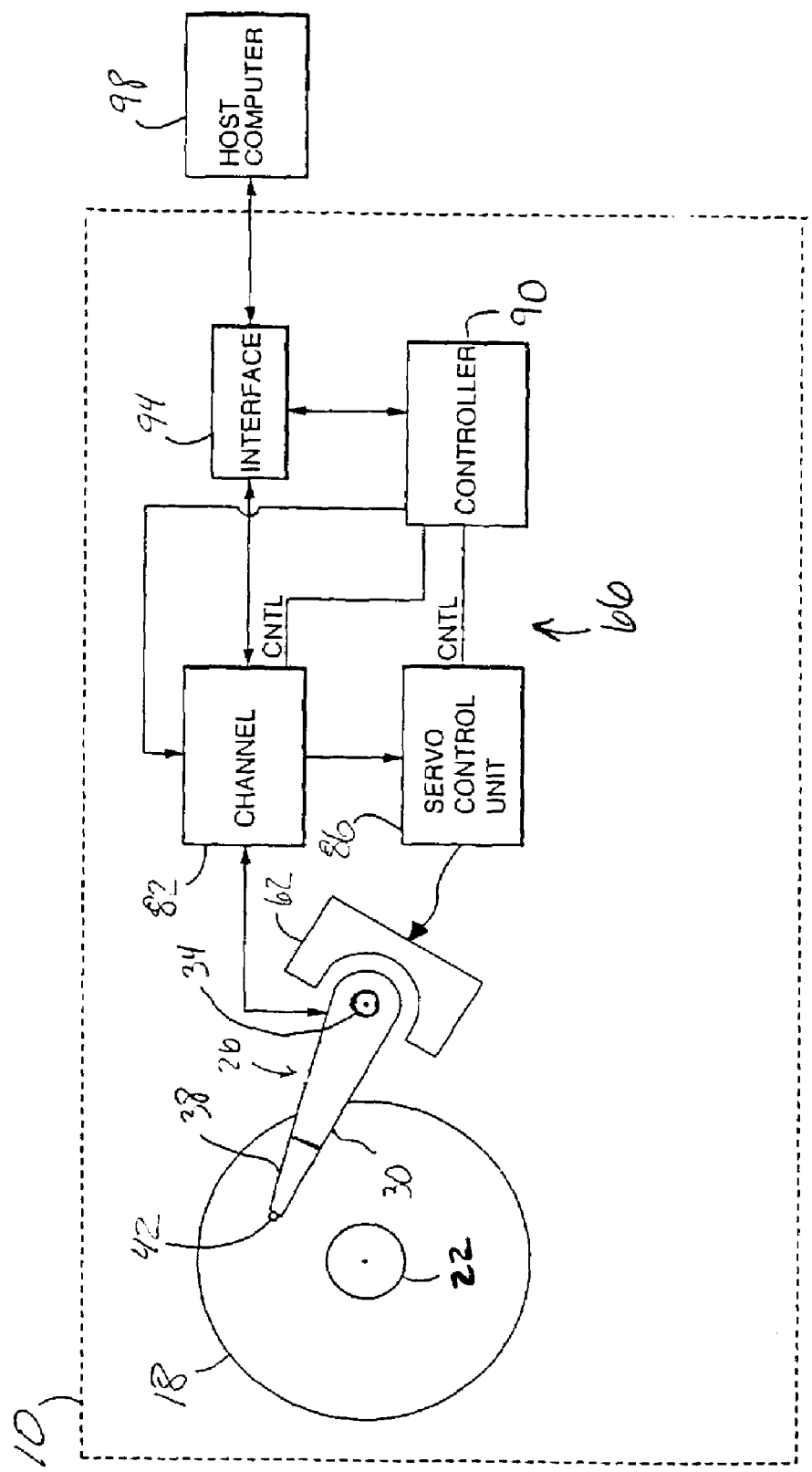

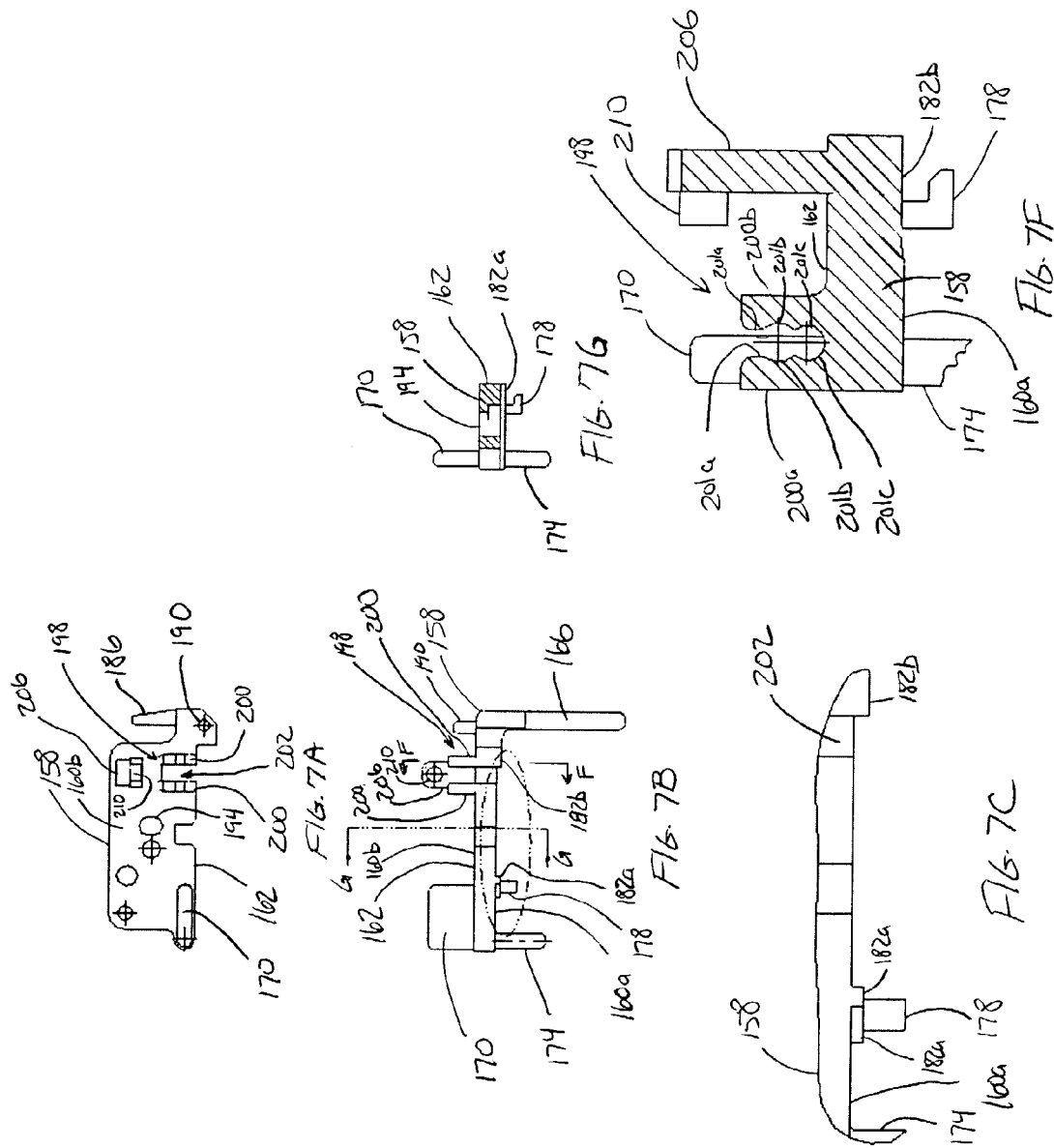

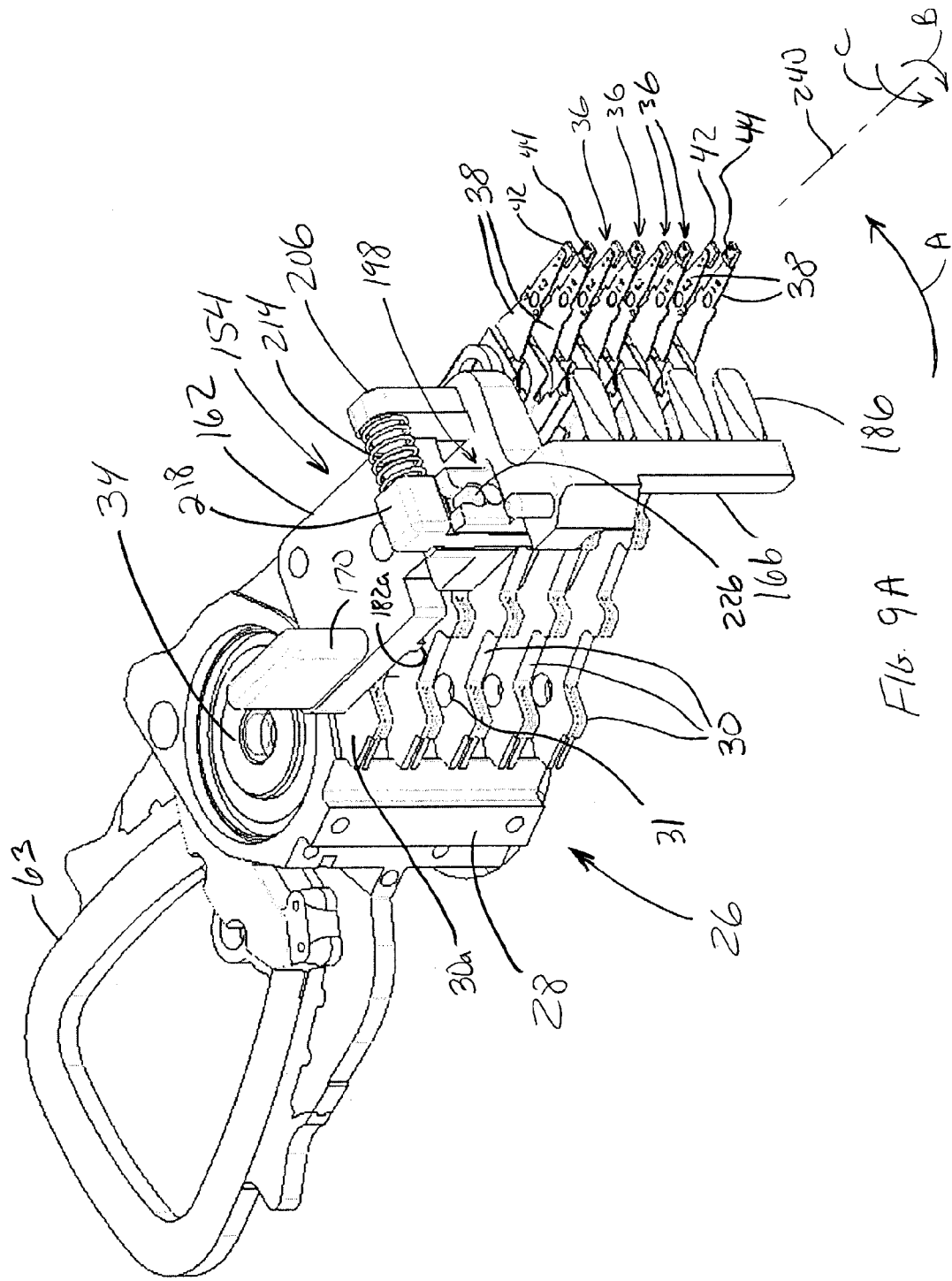

SPRING ASSISTED HEAD STACK ASSEMBLY COMB

CROSS-REFERENCE TO RELATED APPLICATIONS

This patent application claims priority under 35 U.S.C. §119(e) to U.S. Provisional Patent Application Ser. No. 60/432,158, that is entitled "Spring Assisted Head Stack Assembly Comb," that was filed on Dec. 10, 2002, and the entire disclosure of which is incorporated by reference in its entirety herein.

FIELD OF THE INVENTION

The present invention generally relates to the field of disk drives and, more particularly, to a comb that may be utilized to retain various heads of a head stack assembly in spaced relation, including in conjunction with the original assembly and any subsequent rework/rebuild of the head stack assembly, as well as in conjunction with any shipping of the head stack assembly for integration with a hard disk assembly for a disk drive.

BACKGROUND OF THE INVENTION

One common basic disk drive design uses multiple, rigid, vertically spaced actuator arms or tips that extend outwardly from a common actuator body. This actuator body is rotatably or pivotably interconnected with the baseplate and/or cover of the disk drive by a pivot bearing or the like. Part of the disk drive's voice coil motor is also typically mounted on this actuator body in a position that is typically directly opposite the plurality of actuator arms.

A head gimbal assembly is attached to each actuator arm, and the resulting configuration is commonly referred to in the art as a head stack assembly. Each head gimbal assembly includes a flexible load beam or suspension and a head. One end of the suspension is mounted on an end portion of the actuator arm in an appropriate manner (e.g., using a gimbaled connection). The head (e.g., one or more transducers) is mounted on the opposite end of the suspension and exchanges signals with the corresponding recording media (e.g., a computer-readable storage disk) when installed in the drive.

Certain pairs of adjacent head gimbal assemblies may be biased toward each other. In any case, heads may be damaged by undesired contact prior to be installed in a hard disk assembly having a plurality of vertically spaced computer-readable storage disks. It is common practice in the disk drive industry to use a head stack assembly comb at various times throughout the overall assembly of a disk drive. One embodiment of such a head stack assembly comb is illustrated in FIG. 1.

The head stack assembly comb 110 of FIG. 1 is of integral or one-piece construction (e.g., an injection molded part) with no moving parts. That is, all portions of the comb 110 are in a fixed positional relation to each other. The comb 110 includes a comb body 114. A pivot pin 130 extends from a lower surface of the comb body 114 to provide an interface with a disk drive head stack assembly. Handling of the comb 110 may be enhanced by forming a handle 126 on an upper surface of the comb body 114.

The comb body 114 has a horizontal arm or arm-like structure 118, as well as a vertical arm or arm-like structure 122. A plurality of vertically spaced head separators 146 project outwardly from the vertical arm 122. A given head separator 146 may be disposed between an adjacent pair of head gimbal assemblies of a disk drive head stack assembly to attempt to maintain their corresponding heads in spaced relation. Typically each head separator 146 engages the flexible suspension of each relevant adjacent pair of head gimbal assemblies.

Installation of the head stack assembly comb 110 of FIG. 1 would initially entail disposing the pivot pin 130 within a hole formed in the actuator body of the disk drive head stack assembly or one or more of the actuator arms. An actuator arm catch 134 extends from the lower surface of the comb body 114 and would be disposed within a cut-out formed in the uppermost actuator arm of the head stack assembly at this time. Typically the horizontal arm 118 of the comb body 114 initially will be positioned relative to the disk drive head stack assembly so that the head separators 146 are initially disengaged from the head stack assembly. The head stack assembly comb 110 may then be pivoted so that one or more actuator arm supports 142 engage an upper surface of the uppermost actuator arm in the head stack assembly and so that the head separators 146 are disposed between an certain adjacent pairs of head gimbal assemblies. Typically the head separators 146 will be configured to facilitate this installation and will engage the suspensions of the relevant head gimbal assemblies. This pivotal motion will also dispose a leg 138 of the comb 110 under the uppermost actuator arm. This leg 138 extends from a lower surface of the comb body 114 and will be disposed in vertically spaced relation to the uppermost actuator arm when the comb 110 has been installed in the above-noted manner. The actuator arm catch 134 also receives or captures this same uppermost actuator arm, although typically these are in slightly spaced relation.

The head stack assembly comb 110 may be used in combination with a head protection fixture to ship a head stack assembly for installation in a corresponding hard disk assembly at another location. This head protection fixture facilitates securing the head stack assembly comb 110 to the disk drive head stack assembly. During a significant number of assembly and disassembly processes associated with the manufacture of the head stack assembly/hard disk assembly, the head protection fixture is not applicable and may not be installed. However, the head stack assembly comb 110 is still needed.

There are a number of problems associated with the head stack assembly comb 110 of FIG. 1. One problem is that the comb 110 is unstable when installed on a disk drive head stack assembly having an odd number of head gimbal assemblies. That is, the comb 110 will not sit flat on the upper surface of the uppermost actuator arm of the head stack assembly in this case. The comb 110 will then no longer control HGA alignment to the actuator body. HGA alignment is a critical component for ensuring a successful interface with head merge scissors, dynamic actuator tester ramps, and HSA tooling and the like.

Another problem with the head stack assembly comb 110 is that without the above-noted head protection fixture, the retention forces for maintaining the comb 110 on the head stack assembly are significantly reduced. Principally, the comb 110 is maintained relative to the head stack assembly at this time solely by the frictional interface between its head separators 146 and their corresponding pairs of head gimbal assemblies. Once again, certain adjacent pairs of head gimbal assemblies within the head stack assembly are biased toward each other, and a head separator 146 is disposed between each of such pairs. This is an insufficient retention force for many purposes.

BRIEF SUMMARY OF THE INVENTION

The present invention generally relates to a head stack assembly comb for a disk drive. More specifically, the present invention is generally directed to a device that may be installed on a head stack assembly of a disk drive to maintain various of the heads of the head stack assembly in vertically spaced relation. Both the structure of this comb and the way in which this comb may be used in relation to a disk drive head stack assembly are encompassed by the present invention. This comb may be used in the primary building of the head stack assembly (typically after the installation of the various head gimbal assemblies on their corresponding actuator arm), for any reworking of the head stack assembly, and in the transport of the head stack assembly for incorporation into a disk drive.

A first aspect of the present invention is directed to a method for installing a comb on a head stack assembly for a disk drive. The comb includes a comb body and a plurality of head separators that are interconnected with this comb body. The comb body, along with the various head separators, are pivoted relative to the head stack assembly to dispose the various head separators in a head-separating position within the head stack assembly. The comb is retained on the head stack assembly when the head separators are disposed in a desired head-separating position. In this regard, a latch associated with the comb is biased into engagement with a first portion of the head stack assembly.

Various refinements exist of the features noted in relation to the first aspect of the present invention. Further features may also be incorporated in the first aspect of the present invention as well. These refinements and additional features may exist individually or in any combination. The head stack assembly for the disk drive may include an actuator body, a plurality of rigid actuator arms that extend from the actuator body, and a separate head gimbal assembly mounted on each actuator arm. Each head gimbal assembly may include a flexible suspension or load beam, a slider, and a head (e.g., one or more transducers) that is carried by the slider. One end of each suspension may be mounted on an end portion of one of the actuator arms, while the slider may be mounted toward an opposite end of the suspension. A given head separator of the comb utilized by the first aspect may engage the suspension of those adjacent pairs of head gimbal assemblies in the head stack assembly that are biased toward each other so as to maintain their corresponding heads in vertically spaced relation. The first portion of the head stack assembly that is engaged by the biased latch may be a lower surface of the uppermost actuator arm within the head stack assembly.

In one embodiment of the subject first aspect, the head separators remain in a fixed position in the vertical dimension. That is, there is no relative movement between the head separators and the comb body. This may be provided in any appropriate manner, including by having the comb body and various head separators be of one-piece construction (e.g., an injection-molded part). However, the various head separators could be separately mounted on the comb body and still provide the desired fixed position in the vertical dimension.

One way to characterize the pivotal motion associated with the first aspect is that each head separator of the comb in moved at least generally parallel with the above-referenced actuator arms of the head stack assembly. Another way to characterize this pivotal motion is that each head separator is moved at least generally parallel within a reference plane that is perpendicular to an axis about which the head stack assembly moves when installed in the disk drive. Yet another way to characterize the pivotal motion of the head separators is that they are "swung" into position within the head stack assembly, along with the comb body.

The retention of the comb on the head stack assembly in accordance with the first aspect may be provided by including a movable latch as part of the comb. Movement of the latch may be in response to or initiated by the pivoting of the comb body and the head separators into their head-separating position within the head stack assembly. That is, the latch need not be manually manipulated to install the comb on the head stack assembly. The latch may be characterized as undergoing multiple, separate and discrete movements when the comb is being installed on the head stack assembly as well. During one portion of the movement of the comb body and head separators toward the engaged or installed position within the head stack assembly, the latch may be characterized as moving at least generally in one direction. Some time thereafter the latch may move in an opposite direction toward a position where it engages the first portion of the head stack assembly to facilitate the retention of the comb on the head stack assembly. In one embodiment, the latch moves from a first position to a second position, and then at least back toward (but not necessarily to) the first position during the installation of the comb in accordance with the first aspect.

In one embodiment of the subject first aspect, the latch is brought into engagement with part of the head stack assembly as the head separators are pivoted toward the installed position within the head stack assembly. Further movement of the head separators toward the installed position within the head stack assembly will then move the latch in a first direction. In the case where the pivoting of the comb body and head separators may be characterized as being in a direction that is generally toward the head stack assembly, the movement of the latch in this first direction may be characterized as being at least generally away from the head stack assembly. As such, the movement of the head separators and this initial movement of the latch when brought into engagement with the head stack assembly may be characterized as being at least generally opposite of each other.

At least at some point in time after the latch has moved in the above-noted first direction by being brought into engagement with the head stack assembly by the pivoting of the comb body and head separators toward the head stack assembly, the latch moves in a second direction to facilitate the retention of the comb on the head stack assembly by its engagement of the first portion of the head stack assembly. Movement of the latch in the second direction may be characterized as being opposite the initial movement of the latch in the first direction. In one embodiment, the latch is mounted on the comb body such that the latch initially pivots about an axis in one direction during the initial engagement with the head stack assembly, and thereafter pivots about this same axis in an opposite direction to facilitate the retention of the comb on the head stack assembly by the noted engagement.

The above-noted movement of the latch in the second direction to facilitate the retention of the comb on the head stack assembly may be provided by the action of one or more appropriate biasing members on the latch. In one embodiment, this biasing member(s) is in the form of a compression spring the like. Other appropriate biasing members may be utilized (e.g., an elastomer). Moreover, any appropriate number of biasing members may be utilized, and these may be of any appropriate configuration. Movement of the latch in the first direction by the initial engagement with the head stack assembly may compress the associated biasing member(s). Eventually sufficient forces will be stored/generated within the biasing member(s) to move the latch in the second direction to facilitate the retention of the comb on the head stack assembly. In one embodiment, this movement of the latch in the second direction occurs at least generally toward the end of the pivotal motion that disposes the head separators in the desired head-separating position within the head stack assembly. Preferably, the latch exerts an at least generally upwardly directed force on the lower surface of the uppermost actuator arm of the head stack assembly, while one or more portions of the comb body engage an upper surface of this particular actuator arm. Active biasing forces are preferably being exerted on the latch after having moved in the second direction and while in engagement with the first portion of the head stack assembly so as to retain the comb in position relative to the stack assembly.

A second aspect of the present invention is directed to a method for installing a comb on a head stack assembly for a disk drive. This comb includes a plurality of vertically spaced head separators and a latch. The plurality of head separators are moved relative to the head stack assembly to dispose the same into a head-separating position within the head stack assembly. This movement of the head separators also brings the latch into engagement with a first portion of the head stack assembly, and a continuation of this movement of the head separators relative to the head stack assembly moves the latch from a first position to a second position while remaining engaged with the head stack assembly. Once the latch reaches the second position, at least some time thereafter the latch moves back at least toward (but not necessarily to) the first position to facilitate the retention of the comb on the head stack assembly.

Various refinements exist of the features noted in relation to the second aspect of the present invention. Further features may also be incorporated in the second aspect of the present invention as well. These refinements and additional features may exist individually or in any combination. The head stack assembly for the disk drive may include an actuator body, a plurality of rigid actuator arms that extend from the actuator body, and a separate head gimbal assembly mounted on each actuator arm. Each head gimbal assembly may include a flexible suspension or load beam, a slider, and a head (e.g., one or more transducers) that is carried by the slider. One end of each suspension may be mounted on an end portion of one of the actuator arms, while the slider may be mounted toward an opposite end of the suspension. A given head separator of the comb utilized by the second aspect may engage the suspension of those adjacent pairs of head gimbal assemblies in the head stack assembly that are biased toward each other so as to maintain their corresponding heads in vertically spaced relation. The first portion of the head stack assembly that is initially engaged by the latch (and thereby causes the latch to move from its first position to its second position) may be a side surface of the uppermost actuator arm within the head stack assembly. Movement of the latch from the second position at least back toward the first position may be to allow the latch to engage a lower surface of this uppermost actuator arm within the head stack assembly, to in turn facilitate the retention of the comb on the head stack assembly.

In one embodiment of the subject second aspect, the head separators are mounted on a comb body and remain in a fixed position in the vertical dimension relative to this comb body. That is, there is no relative movement between the head separators and the comb body during the movement the disposes the head separators in their head-separating position within the head stack assembly. This may be provided in any appropriate manner, including by having the comb body and various head separators be of one-piece construction (e.g., an injection-molded part). However, the various head separators could be separately mounted on the comb body and still provide the desired fixed position in the vertical dimension.

One way to characterize the movement of the various head separators in accordance with the second aspect is that the plurality of head separators are pivoted about a single common axis. This pivot axis may be parallel with an axis about which the head stack assembly moves when installed in the disk drive. Another way to characterize this installing movement of the head separators is that each head separator is moved at least generally parallel with the above-noted actuator arms of the head stack assembly. Another way to characterize the installing movement of the head separators is that each head separator is moved at least generally within a reference plane that is perpendicular to an axis about which the head stack assembly moves when installed in the disk drive. Yet another way to characterize the installation motion of the plurality of vertically spaced head separators is that they are "swung" into position within the head stack assembly.

The movement of the latch in accordance with the second aspect may be in the form of opposite movements. In one embodiment, the latch is pivotally interconnected with the comb body such that it pivots in one direction when initially brought into engagement with the first portion of the head stack assembly, and such that it thereafter pivots in the opposite direction to facilitate the retention of the comb on the head stack assembly. In one embodiment, the latch engages the side of the uppermost actuator arm in the head stack assembly by a movement of the various head separators toward the head stack assembly. In any case, continued movement of the various head separators toward the head stack assembly, along with the continued engagement of the latch against the head stack assembly, is preferably all that is required to move the latch from the first position to its second position. That is, the latch need not be manually manipulated by an individual to install the comb on the head stack assembly in accordance with the second aspect.

Movement of the latch from the second position back toward the first position in the case of the second aspect may be provided by one or more biasing members that appropriately engage the latch. In one embodiment, the biasing member(s) is in the form of a compression spring or the like. Other appropriate biasing members may be utilized (e.g., an elastomer). Any number of biasing members may be utilized, and the same may be of any appropriate configuration. Movement of the latch from the first position to the second position may compress the biasing member(s). Eventually sufficient forces will be stored/generated within the biasing member(s) to move the latch from the second position back at least toward the first position to facilitate the retention of the comb on the head stack assembly. In one embodiment, this movement of the latch from the second position at least back toward the first position occurs at least generally toward the end of the motion that disposes the head separators in the desired head-separating position within the head stack assembly. Preferably, the latch exerts an at least generally upwardly directed force on the lower surface of the uppermost actuator arm of the head stack assembly, while one or more portions of the comb body engage an upper surface of this particular actuator arm. Active biasing forces are being exerted on the latch when the latch moves from its second position at least back toward the first position, which is then transferred to the engaged portion of the head stack assembly.

A third aspect of the present invention is directed to a head stack assembly comb for a disk drive. This comb includes a comb body and a plurality of vertically spaced head separators. These head separators are disposed in a fixed positional relationship with the comb body. That is, the various head separators do not move relative to the comb body. In any case, a latch is movably interconnected with the comb body and is used to retain the comb on the head stack assembly. Both the structure of this head stack assembly comb and the use of the same in any aspect of the "making" of the head stack assembly for incorporation into a disk drive is covered by this third aspect (e.g., in the primary build of the head stack assembly; for any rework of the head stack assembly; for use in transportation of the head stack assembly for installation in a hard disk assembly).

Various refinements exist of the features noted in relation to the third aspect of the present invention. Further features may also be incorporated in the third aspect of the present invention as well. These refinements and additional features may exist individually or in any combination. The comb body and the various head separators may be of one-piece construction (e.g., in the form of an injection-molded part). Other configurations may be appropriate that still allow the head separators to be maintained in a fixed position relative to the comb body. Any number of head separators may be utilized. The various head separators may also be of any appropriate configuration for facilitating their disposal in the desired head-separating position within the head stack assembly.

One embodiment of the subject third aspect is directed to the latch exerting an active force on the engaged portion of the head stack assembly when the comb is installed on the head stack assembly so that the head separators are disposed in the desired head-separating position. This force may be derived from one or more biasing members that act upon the latch. Any such biasing member(s) may be in the form of a compression spring the like. Other appropriate biasing members may be utilized (e.g., an elastomer). Any number of biasing members may be utilized, and the same may be of any appropriate configuration. This biasing member(s) may be used to facilitate the installation of the comb on the head stack assembly without requiring the latch to be manually manipulated in any manner. For instance, moving the comb body toward the head stack assembly may cause the latch to engage a portion of the head stack assembly. Continued movement of the comb body may move the latch in one direction so as to compress the associated biasing member(s). This compression of the biasing member(s) may be used to move the latch in a different direction to facilitate the retention of the comb of the third aspect on the head stack assembly. In one embodiment, the latch is pivotally interconnected with the comb body. The above-described two-part motion of the latch may then be in the form of pivoting of the latch in opposite directions to complete the installation of the comb of the third aspect on the head stack assembly. In one embodiment, the latch moves from a first position to a second position, and then at least back toward the first position during the installation of the comb of the third aspect on the head stack assembly. Active biasing forces are being exerted on the latch when the latch moves from its second position at least back toward the first position, which is then transferred to the engaged portion of the head stack assembly.

The disk drive head stack assembly, on which the comb of the third aspect may be installed, may include an actuator body, a plurality of rigid actuator arms that extend from the actuator body, and a separate head gimbal assembly mounted on each actuator arm. Each head gimbal assembly may include a flexible suspension or load beam, a slider, and a head (e.g., one or more transducers) that is carried by the slider. One end of each suspension may be mounted on an end portion of one of the actuator arms, while the slider may be mounted toward an opposite end of the suspension. A given head separator of the comb in the case of the third aspect may engage the suspension of those adjacent pairs of head gimbal assemblies in the head stack assembly that are biased toward each other so as to maintain their corresponding heads in vertically spaced relation. One or more portions of the comb body may engage an upper surface of the uppermost actuator arm in head stack assembly, while the latch may engage a lower surface of this same uppermost actuator arm. In one embodiment: 1) the comb body engages the upper surface of the uppermost actuator arm at first and second locations that are spaced along the length dimension of the actuator arm, while the remainder of the comb body is disposed in spaced relation to this upper surface; and 2) the latch engages the lower surface of this same actuator arm somewhere between these first and second locations. In the above-described embodiment were at least one biasing member is used in relation to the movement of the latch, each such biasing member may be disposed above the upper surface of the uppermost actuator arm, preferably in horizontal fashion or at least generally parallel with this upper surface.

A fourth aspect of the present invention is directed to a head stack assembly comb for a disk drive. This comb includes a comb body and a plurality of vertically spaced head separators. The comb further includes a latch that is movably interconnected with the comb body and that is used to retain the comb on the head stack assembly. The comb body may be pivoted into the installed position on the head stack assembly to dispose the plurality of head separators into a head-separating within the head stack assembly. The latch is also activated by this pivotal motion. The various features discussed above in relation to the third aspect may be used by this fourth aspect, individually or in any combination. Both the structure of this head stack assembly comb and the use of the same in any aspect of the "making" of the head stack assembly for incorporation into a disk drive is covered by this fourth aspect (e.g., in the primary build of the head stack assembly; for any rework of the head stack assembly; for use in transportation of the head stack assembly for installation in a hard disk assembly).

BRIEF DESCRIPTION OF THE SEVERAL VIEWS OF THE DRAWING

FIG. 4 is a side view of one embodiment of a flying-type slider that may be used by the disk drive of FIG. 2.

FIG. 5 is a simplified electrical component block diagram of the disk drive of FIG. 2.

FIG. 7A is a top view of a comb body used by the head stack assembly comb of FIG. 6A.

FIG. 7B is one side view of the comb body used by the head stack assembly comb of FIG. 6A.

FIG. 7C is an enlarged view of the circled area from FIG. 7B.

FIG. 7F is a cross-sectional view of the comb body taken along line F—F in FIG. 7B.

FIG. 7G is a cross-sectional view of the comb body taken along line G—G in FIG. 7B.

FIG. 9A is a perspective view of the head stack assembly comb of FIG. 6A in a disengaged position with one embodiment of a disk drive head stack assembly.

DETAILED DESCRIPTION OF THE INVENTION

Figure 1:
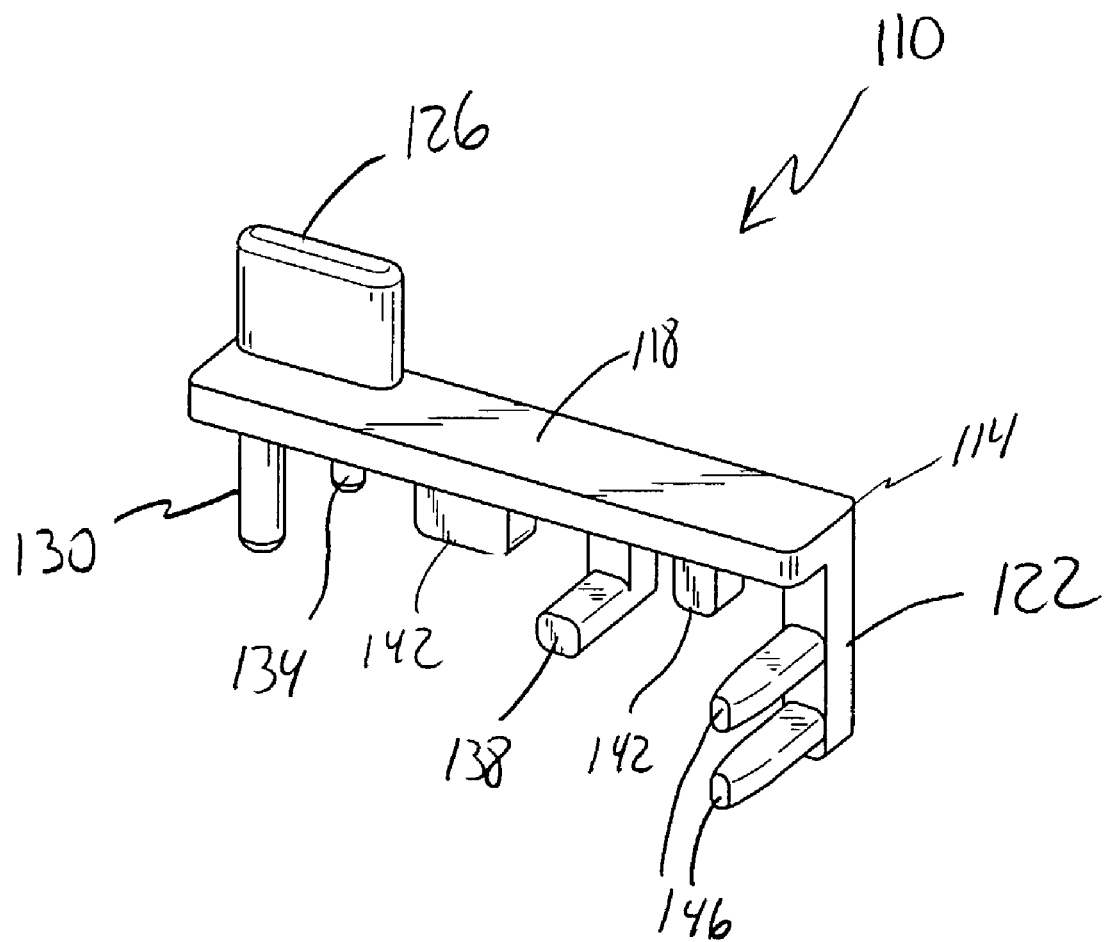
FIG. 1 is a perspective view of one embodiment of a prior art head stack assembly comb.

The present invention will now be described in relation to the accompanying drawings that at least assist in illustrating its various pertinent features. One embodiment of a disk drive 10 is illustrated in FIGS. 2–5. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub or spindle 22, which in turn is rotatably interconnected with the disk drive base plate 14 and/or cover 12. Multiple data storage disks 18 would be mounted in vertically spaced and parallel relation on the spindle 22, and may be characterized as a hard disk assembly or HDA 17. Rotation of the disk(s) 18 is provided by a spindle motor 24 that is appropriately coupled to the spindle 22 to simultaneously spin the data storage disk(s) 18 at an appropriate rate.

The disk drive 10 also includes a head stack assembly or HSA 26, that in turn includes one or more individual rigid actuator arms 30 having a cutout 32 of an appropriate size/shape (e.g., for weight reduction purposes). All actuator arms 30 extend out from an actuator body 28 of the HSA 26. This actuator body 28 is mounted on a pivot bearing 34 to allow the various actuator arms 30 to pivot about the pivot bearing 34. The pivot bearing 34 in turn is rotatably supported by the base plate 14 and/or cover 12. Multiple actuator arms 30 would be disposed in vertically spaced relation, with one actuator arm 30 typically being provided for each major data storage surface of each data storage disk 18 of the disk drive 10. Other actuator arm configurations could be utilized as well, such as an "E" block having one or more rigid actuator arm tips or the like that cantilever from a common structure such as a modified actuator body 28. Unless otherwise noted herein, the term "actuator arm" encompasses both an actuator arm and an actuator arm tip.

Movement of each actuator arm 30 is provided by an appropriate head stack assembly drive, such as a voice coil motor 62 or the like. The voice coil motor 62 may be characterized as a rotary drive. The voice coil motor 62 is a magnetic assembly that controls the movement of each of the actuator arms 30 under the direction of control electronics 66. Typical components of the voice coil motor 62 are a coil 63 that may be mounted one of the actuator arms 30 or any appropriate structure that is pivotable therewith (e.g., on a structure that is interconnected with the actuator body 28 on an opposite side thereof in relation to the actuator arms 30), and a separate magnet 64 that is disposed above and below this coil 63 (the upper magnet not being shown in FIG. 2). The magnets 64 will typically be mounted on the disk drive housing 16. Any appropriate head stack assembly drive type may be utilized by the disk drive 10, including a linear drive (for the case where each of the actuator arms 30 is interconnected with the base plate 14 and/or cover 12 for linear movement versus the illustrated pivoting movement about the pivot bearing 34), as well as other types of rotational/pivoting drives.

A head gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are parts of the HSA 28. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, and without the disk 18 being rotated at a sufficient velocity, the slider 42 would come into contact with the disk 18.

Each head 44 is interconnected with the control electronics 66 of the disk drive 10 by a flex cable 70 that is typically mounted on the head stack assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 along a path 80 and "across" the corresponding data storage disk 18 to position the head 44 at the desired/required radial position on the disk 18 (i.e., at the correct track on the data storage disk 18) for disk drive read/write operations.

When the disk drive 10 is not in operation, the actuator arm(s) 30 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 includes a ramp assembly 78 that is disposed beyond a perimeter of the data storage disk 18 in the illustrated configuration to typically both move the corresponding slider 42 vertically away from its corresponding data storage disk 18 and to also exert somewhat of a retaining force on the corresponding actuator arm 30. Any configuration for the ramp assembly 78 that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 includes an actuator arm assembly latch 74 that moves from a non-latching position to a latching position to engage an actuator arm 30 so as to preclude the same from pivoting in a direction which would tend to drag the slider(s) 42 across its corresponding data storage disk 18.

The slider 42 of the disk drive 10 may be configured to "fly" on an air bearing during rotation of its corresponding data storage 18 at a sufficient velocity. This is schematically illustrated in FIG. 4 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 4, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 2:
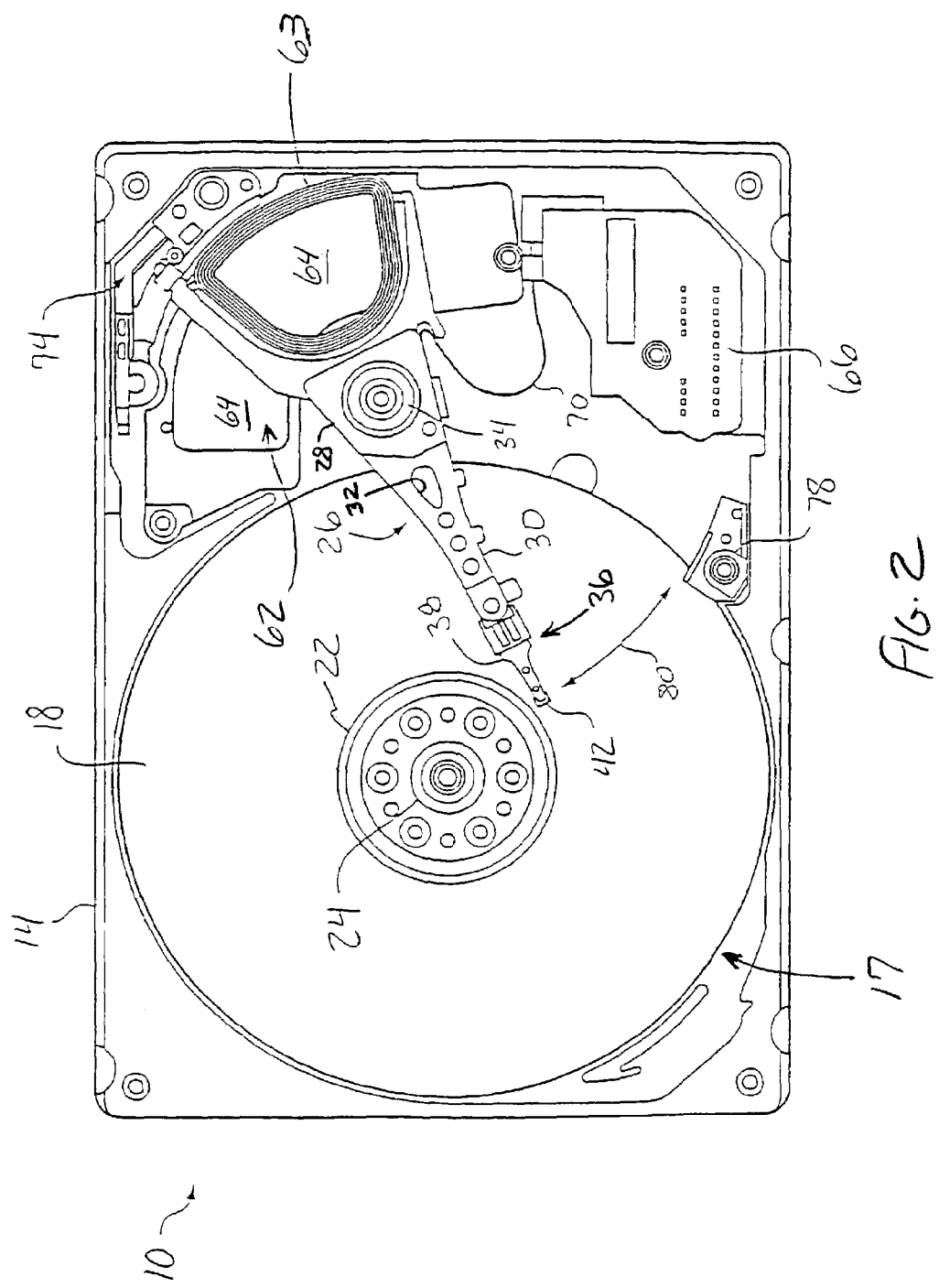
FIG. 2 is a top or plan view of one embodiment of a disk drive.
Figure 3:
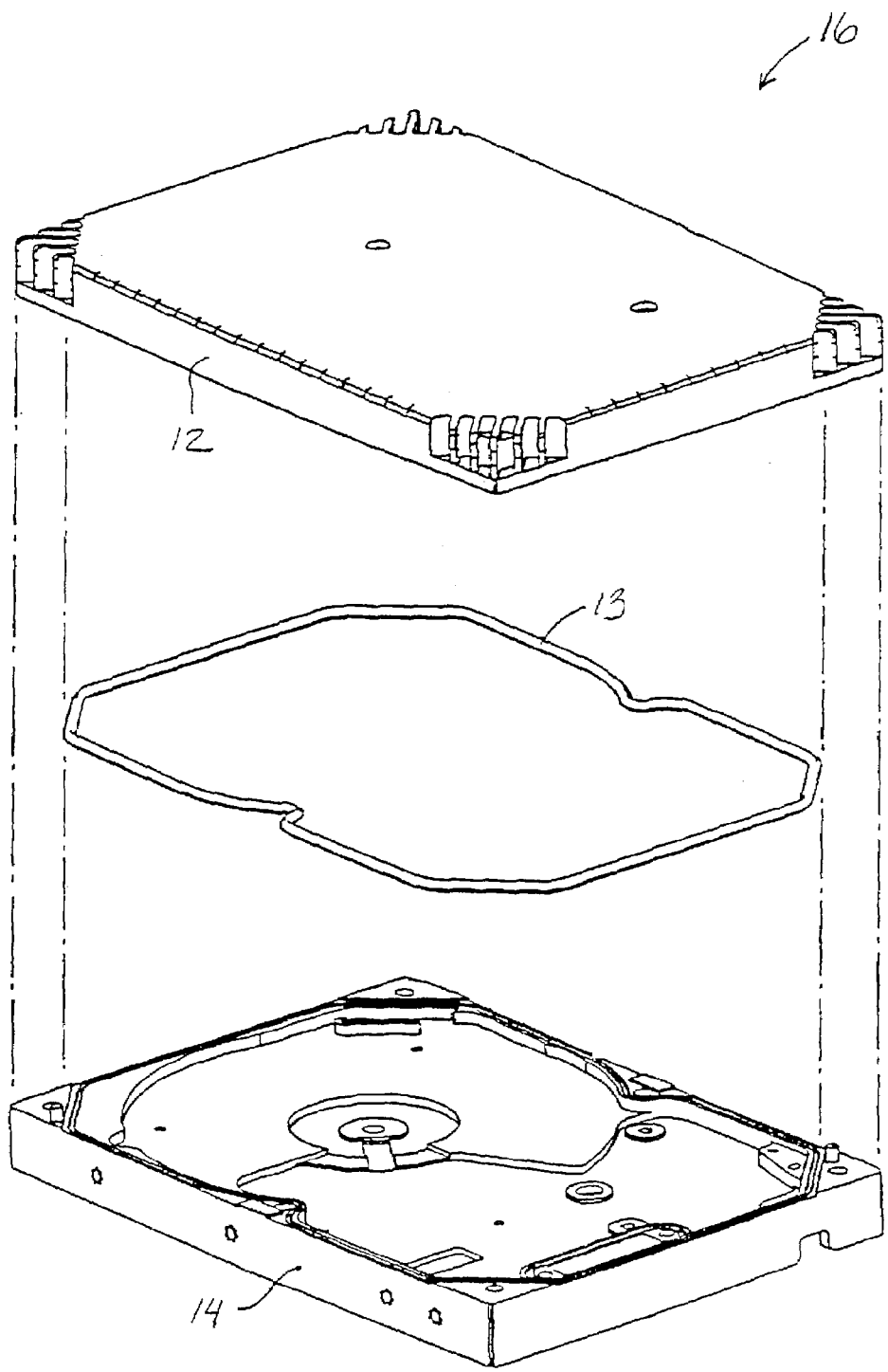
FIG. 3 is an exploded, perspective view of one embodiment of a disk drive housing that may be utilized by the disk drive of FIG. 2.

FIG. 5 illustrates a simplified electrical component block diagram of the disk drive 10 of FIG. 2. The control electronics 66 in this case includes a controller 90 and a servo control unit 86. The disk drive 10 in FIG. 5 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98.

Figure 6A:
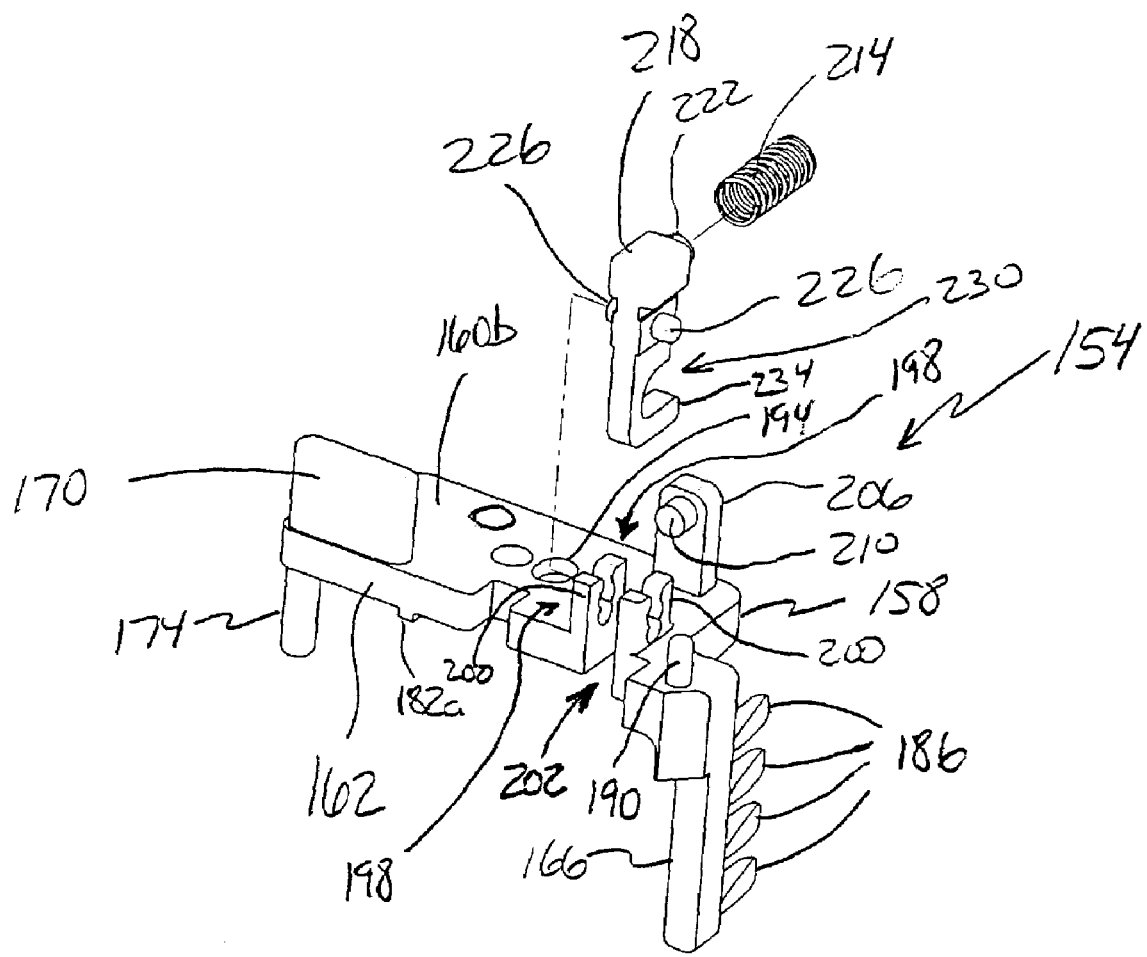
FIG. 6A is a perspective view from one side of one embodiment of a head stack assembly comb having a movable latch in accordance with one or more principles of the present invention.
Figure 6B:
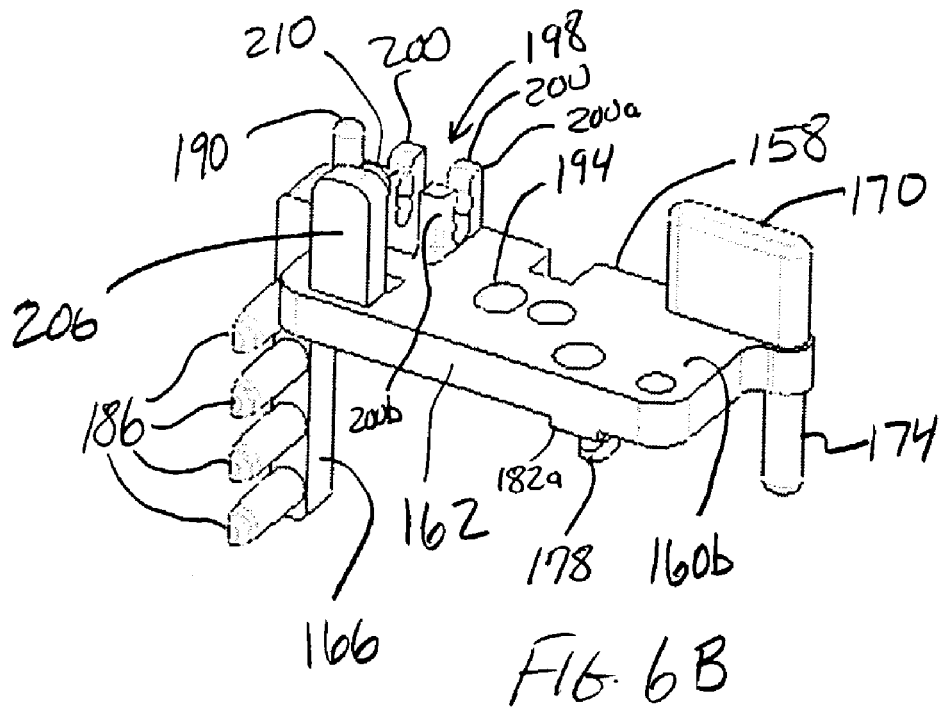
FIG. 6B is a perspective view from another side of the head stack assembly comb of FIG. 6A.
Figure 6C:
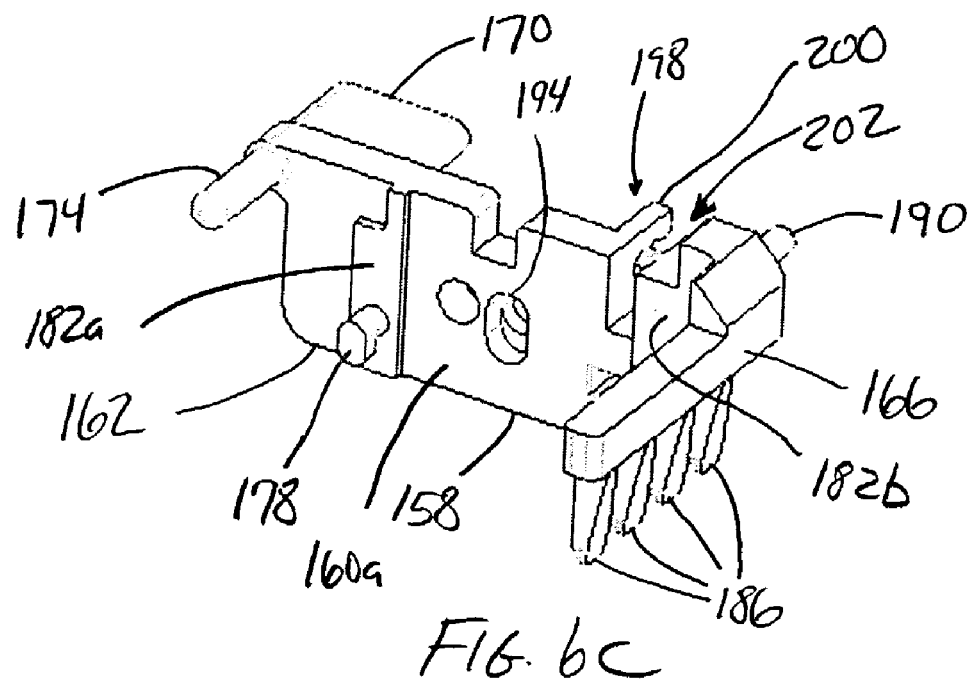
FIG. 6C is a perspective view of the bottom of the head stack assembly comb of FIG. 6A.
Figure 7D:
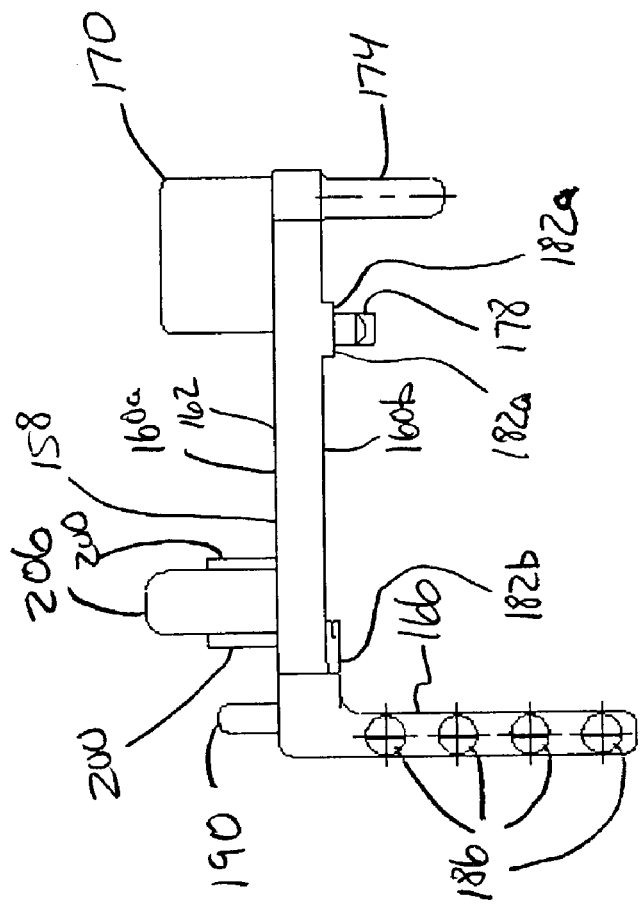
FIG. 7D is another side view of the comb body used by the head stack assembly comb of FIG. 6A.
Figure 7E:
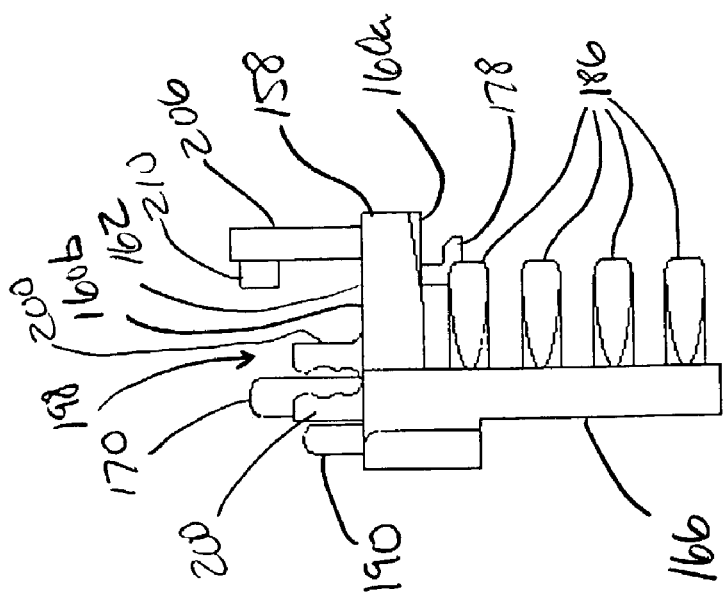
FIG. 7E is one end view of the comb body used by the head stack assembly comb of FIG. 6A.
Figure 8A:
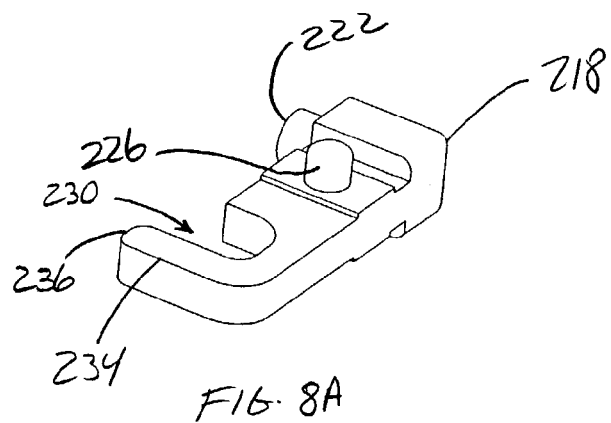
FIG. 8A is a perspective view of a movable latch used by the head stack assembly comb of FIG. 6A.
Figure 8C:
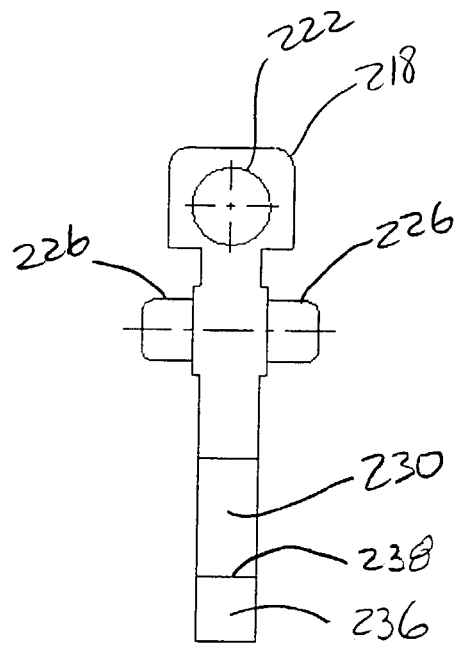
FIG. 8C is one end view of the latch of FIG. 8A.
Figure 8B:
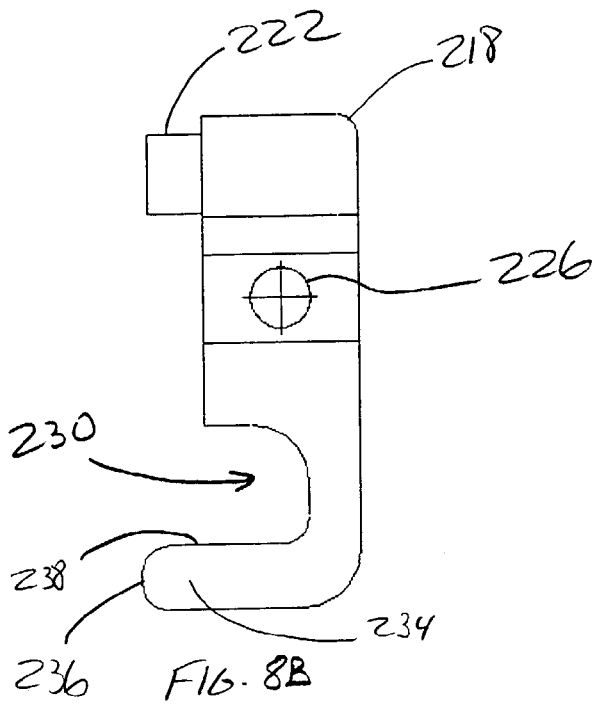
FIG. 8B is one side view of the latch of FIG. 8A.
Figure 8D:
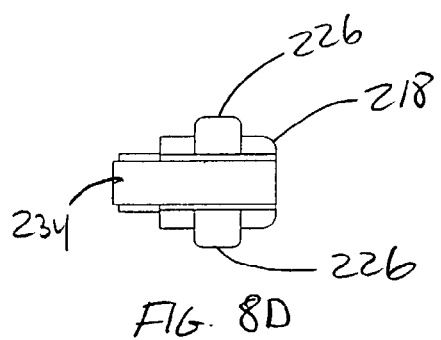
FIG. 8D is a bottom view of the latch of FIG. 8A.

One embodiment of a head stack assembly comb 154 is illustrated in FIGS. 6A–C. Generally, the head stack assembly comb 154 may be mounted on the above-described head stack assembly 26 of the disk drive 10. It should be appreciated that the head stack assembly comb 154 may be readily adapted to work with various other configurations of head stack assemblies for disk drives without departing from its desirable fundamentals to be described herein. In this regard, the head stack assembly comb 154 maintains the heads 44 of the head stack assembly 26 in spaced relation so as to reduce the potential for damage thereto prior to their installation in the disk drive 10. There are two main components of the head stack assembly comb 154, namely a comb body 158 and a latch 218 that are broadly speaking movably interconnected in any appropriate manner. One benefit of this configuration is that it facilitates the installation of the head stack assembly comb 154 on the head stack assembly numeral 26. Another benefit of this configuration is that it enhances the retention of the head stack assembly comb 154 on the head stack assembly 26. Both the comb body 158 and the latch 218 will now be described in more detail.

Details regarding the comb body 158 are illustrated in FIGS. 7A–G in addition to FIGS. 6A–C noted above. The comb body 158 includes both a horizontal arm 162 and a vertical arm 166. A pivot pin 174 extends downwardly from a lower surface 160a of the comb body 158 and provides a movable connection or interface between the head stack assembly comb 154 and the head stack assembly 26. This pivot pin 174 may be disposed within a vertically disposed aperture or hole in the actuator body 28 of the head stack assembly 26, or alternatively in a hole or aperture in one or more of the individual actuator arms 30. Installation of the pivot pin 174 within the head stack assembly 26 may be enhanced by including a handle 170 on an upper surface 160b of the comb body 158.

The vertical arm 166 of the comb body 158 provides a support for a plurality of head separators 186 that are vertically spaced along the vertical arm 166. Each head separator 186 is disposed between a pair of the adjacently disposed head gimbal assemblies 36 of the head stack assembly 26. This then keeps the heads 44 of these head gimbal assemblies 36 in spaced relation. Any appropriate configuration may be utilized by the head separators 186 (e.g., to facilitate their positioning between adjacent pairs of head gimbal assemblies 36 of the head stack assembly 26 and/or the maintenance of their corresponding heads 44 in vertically spaced relation).

The lower surface 160a of the comb body 158 includes a pair of separate and discrete actuator arm supports 182a, 182b that are spaced along the length dimension of the horizontal arm 162 of the comb body 158. There may be a slight vertical offset between the actuator arm support 182a and the actuator arm support 182b to accommodate the configuration of the actuator arm 30 being engaged by the supports 182a, 182b. Preferably the actuator arm supports 182a, 182b dispose the horizontal arm 162 of the comb body 158 in parallel relation with the various actuator arms 30 of the head stack assembly 26. That is, the actuator arm supports 182a, 182b are disposed on and engage the upper surface of the uppermost actuator arm 30 of the head stack assembly 26 at two discrete, spaced locations when the head stack assembly comb 154 is installed on the head stack assembly 26. All other portions of the lower surface 160a of the comb body 158 may be disposed in spaced relation to the upper surface of the noted actuator arm 30 in the illustrated embodiment.

An actuator arm catch 178 is also disposed on and extends downwardly from the lower surface 160a of the comb body 158. This actuator arm catch 178 is initially disposed within the cut-out 32 of the uppermost actuator arm 30 of the head stack assembly 26 when the head stack assembly comb 154 is being installed on the head stack assembly 26. When the head stack assembly comb 154 is pivoted into an engaged position with the head stack assembly 26 in a manner that will be discussed in more detail below in relation to FIGS. 9A–B, a portion of the uppermost actuator arm 30 is disposed within or captured by the actuator arm catch 178. The lower surface of this uppermost actuator arm 30 will typically be slightly spaced from the actuator arm catch 178. However, the lower surface of this uppermost actuator arm 30 may actually be engaged and supported by the actuator arm catch 178. In any case, the actuator arm catch 178 enhances at least certain aspects of the retention of the head stack assembly comb 154 on the head stack assembly 26. Any appropriate configuration may be used by the actuator arm catch 178 to provide the noted functionality.

A latch recess 202 is formed in the horizontal arm 162 of the comb body 158 to accommodate installation of the latch 218 on the comb body 158. In this regard, a latch mount 198 is disposed on the upper surface 160b of the comb body 158, more specifically on the horizontal arm 162. This latch mount 198 includes a pair of legs 200 that are spaced along the length dimension of the horizontal arm 162 to accommodate receipt of the latch 218. Each leg 200 includes a first leg section 200a and a second leg section 200b that are disposed in spaced relation. Both the first leg section 200a and the second leg section 200b of each leg 200 include what may be characterized as an upper section 201a, a middle section 201b, and a lower section 201c. Notwithstanding the discussion of the comb body 158 and the various other structures/features of the head stack assembly comb 154, preferably all of the head stack assembly comb 154 is of one-piece construction (e.g., an injection molded part), except for the latch 218 (which in one embodiment itself is also on the one-piece construction) and a corresponding biasing spring 214 that will now be discussed in more detail.

Details regarding the above-noted latch 218 are presented in FIGS. 8A–D in addition to FIGS. 6A–C noted above. The latch 218 includes an actuator arm cavity 230 for receiving the vertical extent or thickness of the uppermost actuator arm 30 of the head stack assembly 26 when the head stack assembly comb 154 is installed on the head stack assembly 26. Another part of the latch 218 is an actuator arm support 234. This actuator arm support 234 includes a nose 236 and an actuator arm interface surface 238. Generally and again as will be discussed in more detail below in relation to FIGS. 9A–B, the latch 218 engages the lower surface of the uppermost actuator arm 30 of the head stack assembly 26 when the head stack assembly comb 154 is installed on the head stack assembly 26 and exerts an active force thereon.

Movement of the latch 218 relative to the comb body 158 is required when installing the head stack assembly comb 154 on the head stack assembly numeral 26. In this regard, the latch 218 further includes a pair of pivot pins 226 for movably interconnecting the latch 218 with the comb body 158. Each pivot pin 226 is rotatably supported by one of the legs 200 of the latch mount 198. In this regard and referring now as well to FIG. 7F, each pivot pin 226 is disposed between a first leg section 200a and a second leg section 200b of one of the legs 200 and will generally rest on the upper section 210a of these leg sections 200a, 200b. The latch 218 may then be forcibly advanced toward the comb body 158. This increases the spacing between the first leg section 200a and the second leg section 200b of each of the legs 200 (i.e., spreads the first leg section 200a and the second leg section 200b of each leg 200 apart). The contour of the lower leg section 201c of each of the first leg section 200a and the second leg section 200b of each leg 200 facilitates this "spreading" movement of the first leg section 200a and the second leg section 200b. The latch 218 is advanced relative to the comb body 158 until each pivot pin 226 is disposed within the middle section 201b of the first leg section 201a and second leg section 201b of the corresponding leg 200. At this time, the first leg section 201a and second leg section 201b move back toward each other to appropriately capture the corresponding pivot pin 226 of the latch 218. Each middle section 201b is preferably contoured to interface with an arcuate segment of one of the pivot pins 226 of the latch 218 (e.g., each middle section 201b is preferably arcuately shaped).

The latch 218 is biased to an engaged or latching position in relation to the head stack assembly 26. In this regard, a spring support 206 extends from the upper surface 160b of the comb body 158 and includes a mounting boss 210 (e.g., FIGS. 6A–B, FIGS. 7B, 7F). Similarly, the latch 218 also includes a mounting boss 222 (e.g., FIG. 6A, FIGS. 8A–D). One end of the spring 214 is disposed on the mounting boss 210 on the spring support 206 of the comb body 158. Another end of the spring 214 is disposed on the mounting boss 222 of the latch 218. The spring 214 is of the compression type in the illustrated embodiment. Other spring configurations could also be utilized, as well as other types of biasing members in general (e.g. an elastomer). Multiple biasing members also could be utilized. Based upon the foregoing, it should be appreciated that the head stack assembly comb 154 need only include three separately formed parts, namely the latch 218, the spring 214, and the comb body 158.

At times the above-described head stack assembly comb 154 may be used in combination with a separate head protection fixture (not shown). In this regard, the head stack assembly comb 154 may include any appropriate structure for enhancing the interface with such a head protection fixture. In the illustrated embodiment, the comb body 158 includes a head protection fixture mounting pin 190, as well as a head protection fixture mounting hole 194, for providing a desired interface with such a head protection fixture.

Figure 9B:
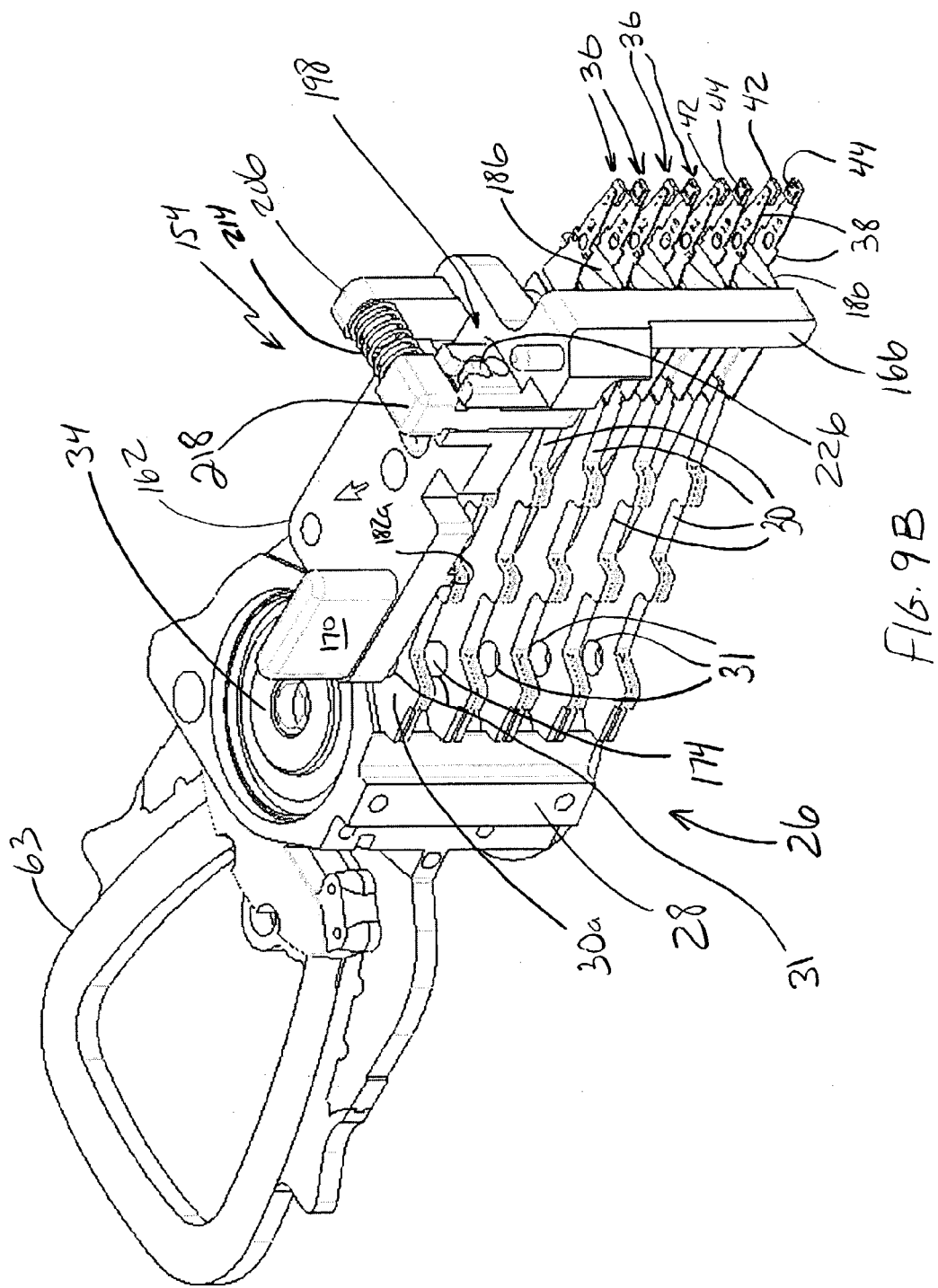
FIG. 9B is a perspective view of the head stack assembly comb of FIG. 6A in an engaged position with one embodiment of a disk drive head stack assembly.

FIGS. 9A–B illustrate the installation of the above-described head stack assembly comb 154 on the head stack assembly 26. The pivot pin 174 of the comb 154 is disposed through/within a hole 31 in at least one of the actuator arms 30 of the head stack assembly 26. Typically the pivot pin 174 will be disposed within the hole 30 of multiple actuator arms 30. Another option would for the actuator body 28 of the head stack assembly 26 to include an appropriate mounting hole (not shown) for the pivot pin 174 of the comb 154. In any case, the head separators 186 of the head stack assembly comb 154 will typically be disposed in radially spaced relation to their corresponding pair of head gimbal assemblies 36 of the head stack assembly 26 when the comb 154 is initially positioned relative to the head stack assembly 26. However, each head separator 186 will be properly aligned with its corresponding pair of head gimbal assemblies 36 (e.g., disposed within a plane that preferably is about midway of the vertical spacing between the relevant pair of adjacent head gimbal assemblies 36). This is the position illustrated in FIG. 9A. At this time, a portion of the actuator arm interface 182a of the comb body 158 is engaging the upper surface of the uppermost actuator arm 30a of the head stack assembly 26, as well as possibly a portion of the actuator arm interface 182b of the comb body 158.

The head stack assembly comb 154 is then pivoted about the pivot pin 174 in a direction indicated by the arrow A in FIG. 9A. This pivotal motion directs the head separators 186 toward the head stack assembly 26. One way to describe this pivotal motion is that it is at least generally within a horizontal reference plane or within a plane that is at least generally parallel with the various actuator arms 30. This motion is also at least generally perpendicular to the rotational/pivotal axis of the HSA 26, namely that defined by the pivot bearing 34. Eventually the actuator arm support 234 of the latch 218 will engage the uppermost actuator arm 30a. This will typically be the nose 236 of the latch 218 and the same will typically engage a lower portion of the side wall of the actuator arm 30a. The nose 234 may be configured to direct the latch 218 under this actuator arm 30a. Further pivoting of the head stack assembly comb 154 about the pivot pin 174 in the direction indicated by the arrow A in FIG. 9A will cause the latch 218 to pivot about its pivot pins 226 as the latch 218 remains engaged with the actuator arm 30a. The axis about which the latch 218 pivots is identified by reference numeral 240 in FIG. 9A, and the above-noted pivotal direction of the latch 218 is identified by the arrow B in FIG. 9A. Pivoting of the latch 218 about the pivot axis 240 in the direction indicated by the arrow B compresses the spring 214 that extends between the spring support 206 of the comb body 158 and the latch 218. Stated another way, the latch 218 moves from one position to another without any manual manipulation of the latch 218 being required. This movement of the latch 218 is provided solely by its continued engagement with the actuator arm 30a during the pivoting of the comb 154 relative to the head stack assembly 26.

At some point in time during the pivoting of the head stack assembly comb 154 in the direction indicated by the arrow A in FIG. 9A, the biasing forces being exerted on the latch 218 by the compressed spring 214 will pivot the latch 218 about the pivot axis 240 in the direction indicated by the arrow C in FIG. 9A. This will move the latch 218 back at least toward its original position (prior to engaging the actuator arm 30a). That is, the latch 218 will first pivot in one direction, and then in an opposite direction when installing the head stack assembly comb 154 on the head stack assembly numeral 26.

Pivotal motion of the latch 218 in the direction indicated by the arrow C in FIG. 9A will forcibly engage the latch 218 with the lower surface of the actuator arm 30a. The nose 236 could be the interfacing portion of the latch 218 with the actuator arm 30a. However, the actuator arm interface surface 238 of the latch 218 could also be disposed in interfacing relation with the lower surface of the uppermost actuator arm 30a and exert an at least generally upwardly directed force on this actuator arm 30a. In one embodiment, the actuator arm interface surface 238 is parallel and engaged with the lower surface of the actuator arm 30a when providing the forcible engagement.

The location where the latch 218 engages the lower surface of the uppermost actuator arm 30a is within a range of that portion of the upper surface of the uppermost actuator arm 30a that is being engaged by the actuator arm interface surface 182a and the actuator arm interface surface 182b of the comb body 158. Stated another way, the nose 236 and/or actuator arm interface surface 238 of the latch 218 engage the lower surface of the uppermost actuator arm 30a at a location that is somewhere between where the actuator arm interface surface 182a of the comb body 158 engages the upper surface of the uppermost actuator arm 30a and where the actuator arm interface surface 182b of the comb body 158 engages the upper surface of the uppermost actuator arm 30a at a second, displaced location.

Pivoting the head stack assembly comb 154 from the position illustrated in FIG. 9A and in the direction indicated by the arrow A will also cause each head separator 186 of the head stack assembly comb 154 to engage a corresponding pair of head gimbal assemblies 36. Specifically, each head separator 186 will engage the suspension 38 of its corresponding pair of head gimbal assemblies 36 and will preferably increase the spacing or separation distance between the suspensions 38 of this pair of head gimbal assemblies 36. The head stack assembly comb 154 may be pivoted in the noted manner until its actuator arm catch 178 engages the uppermost actuator 30a. It should be appreciated that the head separators 186 need not increase the spacing between the engaged pair of head gimbal assemblies 36 during the entire time that the head stack assembly comb 154 is pivoted in the direction indicated by the arrow A. Removal of the comb 154 entails pivoting the comb 154 relative to the head stack assembly 26 in the direction that is opposite of that indicated by the arrow A in FIG. 9A.

The pair of head gimbal assemblies 36 that are engaged by a common head separator 186 are those adjacent head gimbal assemblies 36 that are biased toward each other. That is, these particular head gimbal assemblies 35 are biased in a direction that would tend to cause their corresponding heads 44 to come into contact with each other. The head separators 186 of the head stack assembly comb 154 maintain the heads 44 of the head stack assembly 26 in spaced relation, and thereby reduce the potential for damage to the heads 44 of head stack assembly 26.

The above-described head stack assembly comb 154 provides a number of benefits. One is the ease with which the head stack assembly comb 154 may be installed on the head stack assembly 26. What may be characterized as a single manipulated pivotal motion of the head stack assembly comb 154 is all that is required. This pivotal motion again may be described as being parallel with the various actuator arms 30 of the head stack assembly 26. Pivoting the head stack assembly comb 154 in the direction indicated by the arrow A in FIG. 9A disposes the various head separators 186 between their corresponding pairs of head gimbal assemblies 36 and maintains the same in spaced relation. This same pivotal motion also itself moves the latch 218 in a manner that allows the same to desirably engage the uppermost actuator arm 30a. No manual manipulation of the latch 218 is required in order to install the head stack assembly comb 154 on the head stack assembly 26 using the noted pivotal motion of the head stack assembly comb 154. That is, the latch 218 and the various head separators 186 are mounted on a common structure, namely the comb body 158, that undergoes the noted pivotal motion. The movable interconnection between the latch 218 and the comb body 158, along with the manner in which the spring 214 is incorporated, alleviates the need for an individual to manually manipulate the latch 218 when installing the head stack assembly comb 154 on the head stack assembly numeral 26. Instead, an initial engagement of the latch 218 against the uppermost actuator arm 30a during the pivoting of the head stack assembly comb 154 in the direction indicated by the arrow A itself causes the latch 218 to pivot about the pivot pins 226 in the direction indicated by the arrow B. Once the head stack assembly comb 154 has pivoted a sufficient amount in the direction indicated by the arrow A in FIG. 9A, sufficient forces will have been stored in the spring 214 such that the spring 214 itself pivots the latch 218 about the pivot pins 226 in the direction indicated by the arrow C in FIG. 9A. This motion may occur as the comb 154 continues to be pivoted in the direction indicated by the arrow A in FIG. 9A. Although preferably the latch 218 is returned to a position where the actuator arm interface surface 238 is parallel with the lower surface of the uppermost actuator arm 30a when forcibly engaging the actuator arm 30a, and preferably so that these are disposed in interfacing relation, such need not be the case in order for the latch 218 to apply an appropriate retention force to the uppermost actuator arm 30a.

Another benefit provided by the head stack assembly comb 154 is that suitable retention forces maintain the comb 154 on the head stack assembly numeral 26. The comb body 158 again includes a pair of actuator arm supports 182a, 182b that engage the upper surface of the uppermost actuator arm 30a. Other arrangements for having the comb body 158 engage the upper surface of the uppermost actuator arm 30a may be utilized. The opposite surface of this uppermost actuator arm 30a is engaged by the latch 218. Preferably, the latch 218 actually exerts an upwardly directed force on the uppermost actuator arm 30a via the biasing spring 214.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for installing a comb on a disk drive head stack assembly, wherein said head stack assembly comprises a plurality of suspensions, wherein said comb comprises a comb body, a plurality of head separators that are interconnected with said comb body, and a latch, wherein said latch is mounted on said comb body and further is movable relative to said comb body, and wherein said method comprises the steps of:

moving an entirety of said comb into a first position relative said head stack assembly, and thereby including said comb body, said plurality of head separators, and said latch;

pivoting said comb body from said first position relative to and toward said plurality of suspensions of said head stack assembly, wherein said pivoting step comprises disposing said plurality of head separators into a head-separating position within said plurality of suspensions of said head stack assembly, and wherein said pivoting step further comprises moving said latch into an engaged position with a first portion of said head stack assembly; and retaining said comb on said head stack assembly when said plurality of head separators are in said head-separating position within said plurality of suspensions of said head stack assembly, wherein said retaining step comprises biasing said latch into engagement with said first portion of said head stack assembly, and wherein said retaining step comprises moving said latch relative to said comb body from a first position to a second position, and thereafter moving said latch relative to said comb body from said second position at least back toward said first position.

2. A method, as claimed in claim 1, wherein:

said head stack assembly comprises a plurality of vertically spaced actuator arms, wherein said pivoting step comprises moving said plurality of head separators in parallel relation to said plurality of actuator arms.

3. A method, as claimed in claim 1, wherein:

said pivoting step comprises moving each of said plurality of head separators within a reference plane that is perpendicular to an axis about which said head stack assembly moves when installed in a disk drive.

4. A method, as claimed in claim 1, wherein:

said retaining step comprises moving said latch relative to said comb body in response to said pivoting step.

5. A method, as claimed in claim 4, wherein:
said moving said latch step is in an opposite direction of said pivoting step.

6. A method, as claimed in claim 4, wherein:
said moving said latch step comprises engaging said latch against said head stack assembly during said pivoting step.

7. A method, as claimed in claim 1, wherein:
said retaining step comprises executing first and second moving steps, wherein said first moving step comprises moving said latch relative to said comb body in a first direction in response to at least a first portion of said pivoting step, and wherein said second moving step is executed after said first moving step and comprises moving said latch relative to said comb body in a second direction.

8. A method, as claimed in claim 7, wherein:
said first moving step is in an opposite direction of said pivoting step.

9. A method, as claimed in claim 7, wherein:
said second direction is opposite said first direction.

10. A method, as claimed in claim 7, wherein:
said second moving step comprises moving said latch relative to said comb body and toward a latching position in relation to said head stack assembly.

11. A method, as claimed in claim 7, wherein:
said first and second moving steps each comprise pivoting said latch relative to said comb body during said pivoting said comb body step.

12. A method, as claimed in claim 7, wherein:
said biasing step comprises said second moving step.

13. A method, as claimed in claim 12, wherein:
said first moving step comprises compressing a first biasing member, and wherein said second moving step comprises expanding said first biasing member.

14. A method, as claimed in claim 13, wherein:
said first moving step comprises engaging said latch against said head stack assembly during a first portion of said pivoting step, wherein said second moving step is executed during a second portion of said pivoting step following said first portion of said pivoting step.

15. A method, as claimed in claim 7, wherein:
said first moving step comprises engaging said latch against said head stack assembly during a first portion of said pivoting step, wherein said second moving step is executed during a second portion of said pivoting step following said first portion of said pivoting step.

16. A method, as claimed in claim 1, wherein:
said biasing step comprises moving said latch relative to said comb body from said second position at least toward said first position.

17. A method, as claimed in claim 1, wherein:
said biasing step comprises disposing a first biasing member between said latch and said comb body.

18. A method, as claimed in claim 1, further comprising step of:
maintaining a plurality of heads of said head stack assembly in a fixed vertical position relative to said comb.

19. A method, as claimed in claim 1, wherein:
said comb further comprises a pivot pin, wherein said moving an entirety of said comb step comprises disposing said pivot pin within an aperture of said head stack assembly.

20. A method, as claimed in claim 1, wherein:
said head stack assembly further comprises a first actuator arm, wherein said first portion of said head stack assembly is said first actuator arm.

21. A method for installing a comb on a disk drive head stack assembly, wherein said head stack assembly comprises a plurality of suspensions, wherein said comb comprises a comb body, a plurality of head separators that are interconnected with said comb body, and a latch, wherein said latch is mounted on said comb body and further is movable relative to said comb body, and wherein said method comprises the steps of:
moving an entirety of said comb into a first position relative said head stack assembly, and thereby including said comb body, said plurality of head separators, and said latch;
pivoting said comb body from said first position relative to and toward said plurality of suspensions of said head stack assembly, wherein said pivoting step comprises disposing said plurality of head separators into a head-separating position within said plurality of suspensions of said head stack assembly, and wherein said pivoting step further comprises moving said latch into an engaged position with a first portion of said head stack assembly; and
retaining said comb on said head stack assembly when said plurality of head separators are in said head-separating position within said plurality of suspensions of said head stack assembly, wherein said retaining step comprises biasing said latch into engagement with said first portion of said head stack assembly, wherein said retaining step comprises moving said latch relative to said comb body in response to said pivoting step, and wherein said moving said latch step is in an opposite direction of said pivoting step.

22. A method for installing a comb on a disk drive head stack assembly, wherein said head stack assembly comprises a plurality of suspensions, wherein said comb comprises a comb body, a plurality of head separators that are interconnected with said comb body, and a latch, wherein said latch is mounted on said comb body and further is movable relative to said comb body, and wherein said method comprises the steps of:
moving an entirety of said comb into a first position relative said head stack assembly, and thereby including said comb body, said plurality of head separators, and said latch;
pivoting said comb body from said first position relative to and toward said plurality of suspensions of said head stack assembly, wherein said pivoting step comprises disposing said plurality of head separators into a head-separating position within said plurality of suspensions of said head stack assembly, and wherein said pivoting step further comprises moving said latch into an engaged position with a first portion of said head stack assembly; and
retaining said comb on said head stack assembly when said plurality of head separators are in said head-separating position within said plurality of suspensions of said head stack assembly, wherein said retaining step comprises biasing said latch into engagement with said first portion of said head stack assembly, wherein said retaining step comprises executing first and second moving steps, wherein said first moving step comprises moving said latch relative to said comb body in a first direction in response to at least a first portion of said pivoting step, wherein said second moving step is executed after said first moving step and comprises moving said latch relative to said comb body in a second direction, and wherein said first moving step is in an opposite direction of said pivoting step.

23. A method for installing a comb on a disk drive head stack assembly, wherein said head stack assembly comprises a plurality of suspensions, wherein said comb comprises a comb body, a plurality of head separators that are interconnected with said comb body, and a latch, wherein said latch is mounted on said comb body and further is movable relative to said comb body, and wherein said method comprises the steps of:

moving an entirety of said comb into a first position relative said head stack assembly, and thereby including said comb body, said plurality of head separators, and said latch;

pivoting said comb body from said first position relative to and toward said plurality of suspensions of said head stack assembly, wherein said pivoting step comprises disposing said plurality of head separators into a head-separating position within said plurality of suspensions of said head stack assembly, and wherein said pivoting step further comprises moving said latch into an engaged position with a first portion of said head stack assembly; and retaining said comb on said head stack assembly when said plurality of head separators are in said head-separating position within said plurality of suspensions of said head stack assembly, wherein said retaining step comprises biasing said latch into engagement with said first portion of said head stack assembly, wherein said retaining step comprises executing first and second moving steps, wherein said first moving step comprises moving said latch relative to said comb body in a first direction in response to at least a first portion of said pivoting step, wherein said second moving step is executed after said first moving step and comprises moving said latch relative to said comb body in a second direction, and wherein said second direction is opposite said first direction.

24. A method for installing a comb on a disk drive head stack assembly, wherein said head stack assembly comprises a plurality of suspensions, wherein said comb comprises a comb body, a plurality of head separators that are interconnected with said comb body, and a latch, wherein said latch is mounted on said comb body and further is movable relative to said comb body, and wherein said method comprises the steps of:

moving an entirety of said comb into a first position relative said head stack assembly, and thereby including said comb body, said plurality of head separators, and said latch, wherein said comb further comprises a pivot pin, wherein said moving an entirety of said comb step comprises disposing said pivot pin within an aperture of said head stack assembly;

pivoting said comb body from said first position relative to and toward said plurality of suspensions of said head stack assembly, wherein said pivoting step comprises disposing said plurality of head separators into a head-separating position within said plurality of suspensions of said head stack assembly, and wherein said pivoting step further comprises moving said latch into an engaged position with a first portion of said head stack assembly; and retaining said comb on said head stack assembly when said plurality of head separators are in said head-separating position within said plurality of suspensions of said head stack assembly, wherein said retaining step comprises biasing said latch into engagement with said first portion of said head stack assembly.

* * * * *